United States Patent
Shuldman et al.

(10) Patent No.: US 9,158,481 B2
(45) Date of Patent: Oct. 13, 2015

(54) STATUS MONITOR FOR CASINO PRINT SYSTEM AND CORRESPONDING METHODS FOR STATUS MONITORING

(71) Applicant: TransAct Technologies Incorporated, Hamden, CT (US)

(72) Inventors: Bart Shuldman, Westport, CT (US); Shawn Kevin Clarke, Calgary (CA); Donald Brooks, Ithaca, NY (US)

(73) Assignee: TransAct Technologies Incorporated, Hamden, CT (US)

( * ) Notice: Subject to any disclaimer, the term of this patent is extended or adjusted under 35 U.S.C. 154(b) by 177 days.

(21) Appl. No.: 13/625,235

(22) Filed: Sep. 24, 2012

(65) Prior Publication Data

US 2013/0016387 A1      Jan. 17, 2013

Related U.S. Application Data

(63) Continuation-in-part of application No. 13/248,184, filed on Sep. 29, 2011, now Pat. No. 8,953,200.

(60) Provisional application No. 61/541,532, filed on Sep. 30, 2011, provisional application No. 61/404,525, filed on Oct. 4, 2010, provisional application No. 61/456,223, filed on Nov. 2, 2010, provisional application No. 61/458,842, filed on Dec. 1, 2010.

(51) Int. Cl.
*H04N 1/00* (2006.01)
*G06F 3/12* (2006.01)
(Continued)

(52) U.S. Cl.
CPC ............ *G06F 3/1204* (2013.01); *G06F 3/1229* (2013.01); *G06F 3/1288* (2013.01)

(58) Field of Classification Search
CPC .................................. G06F 3/12; G06K 15/02
See application file for complete search history.

(56) References Cited

U.S. PATENT DOCUMENTS

| | | | |
|---|---|---|---|
| 6,134,018 A | 10/2000 | Dziesietnik et al. | |
| 6,205,213 B1 | 3/2001 | Kucmerowski et al. | |

(Continued)

FOREIGN PATENT DOCUMENTS

| | | |
|---|---|---|
| CN | 1261752 | 8/2000 |
| WO | WO 01/84299 | 11/2001 |
| WO | WO 03/083681 | 10/2003 |

OTHER PUBLICATIONS

Gorry Fairhurst, the User Datagram Protocol (UDP), Nov. 19, 2008.*

(Continued)

*Primary Examiner* — Fred Guillermety
*Assistant Examiner* — Henok A Shiferaw
(74) *Attorney, Agent, or Firm* — Lipsitz & McAllister, LLC

(57) ABSTRACT

Systems and methods for monitoring printer status in a networked environment are provided. For each of a plurality of printers, a respective server port device is connected to a communication port of a corresponding printer. Each server port device is adapted to receive real-time printer status information from the corresponding printer. A status monitor is provided for receiving the printer status information from one or more of the server port devices. The printer status information is wirelessly broadcast from the respective server port devices to an IP address of the status monitor. The server port device may comprise a User Datagram Protocol (UDP) status processor for converting the printer status information received from the printer in a first format into a second format for broadcast using a UDP protocol.

18 Claims, 5 Drawing Sheets

(51) Int. Cl.
*G06K 15/00* (2006.01)
*G06F 11/30* (2006.01)

(56) References Cited

U.S. PATENT DOCUMENTS

| | | | |
|---|---|---|---|
| 6,373,587 B1 | 4/2002 | Sansone | |
| 6,623,357 B2 | 9/2003 | Chowdhury | |
| 6,687,016 B2 | 2/2004 | Gauthier | |
| 6,924,903 B2 | 8/2005 | Brooks et al. | |
| 7,008,320 B2 | 3/2006 | Rowe et al. | |
| 7,008,321 B2* | 3/2006 | Rowe et al. | 463/25 |
| 7,202,972 B1 | 4/2007 | Schwier et al. | |
| 7,528,982 B2 | 5/2009 | Mokuya et al. | |
| 7,668,987 B2 | 2/2010 | Brooks et al. | |
| 8,085,418 B2 | 12/2011 | Brooks | |
| 2002/0122205 A1 | 9/2002 | Gauthier | |
| 2002/0194062 A1 | 12/2002 | Linde | |
| 2003/0002081 A1 | 1/2003 | Leone, III et al. | |
| 2003/0051210 A1 | 3/2003 | Collier et al. | |
| 2003/0217329 A1 | 11/2003 | Good | |
| 2004/0095604 A1 | 5/2004 | Meyerhofer | |
| 2004/0223180 A1* | 11/2004 | Brooks | 358/1.15 |
| 2005/0099442 A1 | 5/2005 | Payne | |
| 2005/0246577 A1 | 11/2005 | Okuhara et al. | |
| 2005/0266919 A1 | 12/2005 | Rowe et al. | |
| 2007/0195365 A1 | 8/2007 | Brooks | |
| 2008/0068644 A1* | 3/2008 | Yanagi | 358/1.15 |
| 2008/0123130 A1 | 5/2008 | Matsumoto et al. | |
| 2009/0138635 A1 | 5/2009 | Brooks et al. | |
| 2009/0307068 A1 | 12/2009 | Meyerhofer | |
| 2009/0307501 A1* | 12/2009 | Luciani et al. | 713/192 |
| 2010/0030630 A1 | 2/2010 | Vicens et al. | |
| 2010/0238489 A1* | 9/2010 | Meyerhofer et al. | 358/1.15 |
| 2011/0075190 A1* | 3/2011 | Manico et al. | 358/1.15 |

OTHER PUBLICATIONS

International Search Report for PCT/US12/57168, dated Dec. 24, 2012, one page.
TransAct Technologies Incorporated Press Release, "TransAct Technologies to Showcase New Epic TEN80 Printer at International Gaming Expo (IGE) 2010", Hamden, CT—Jan. 20, 2010, retrieved on Sep. 29, 2010, URL<http://www.transact-tech.com/about/press_release.html?id=351>, 2 pages.
TransAct Technologies Incorporated Press Release, "TransAct's ServerPort Technology to be Featured at G2E", Hamden, CT—Nov. 17, 2008, retrieved on Sep. 29, 2010, URL<http://www.transact-tech.com/about/press_release.html?id=306>, 3 pages.
TransAct Technologies Incorporated Press Release, TransAct Introduces 10 Base-T Ethernet Interface for Its Ithaca Brand Printers, Wallingford, CT—Apr. 13, 2004, retrieved on Sep. 29, 2010, URL>http://www.transact-tech.com/about/press_release.html?id=119>, 2 pages.
TransAct Technologies Incorporated, "ServerPort—Your Printer Connection to the Networked Casino.", 2006, retrieved on Sep. 29, 2010, URL<http://www.transact-tech.com/products/serverport.html>, one page.
TransAct Technologies Incorporated, "ServerPort your printer connection to the Networked Casino", 2009, 2 pages.

* cited by examiner

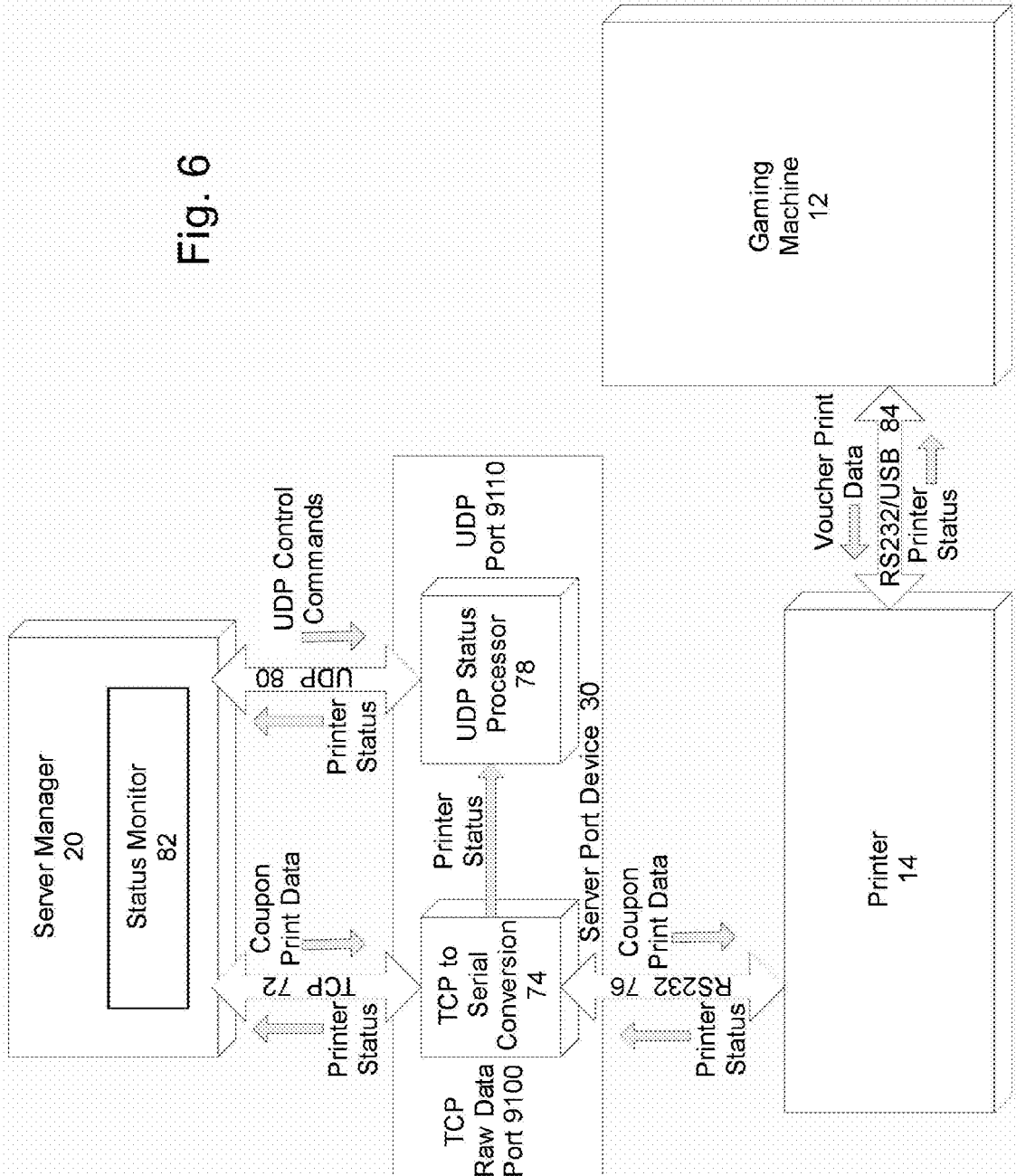

STATUS MONITOR FOR CASINO PRINT SYSTEM AND CORRESPONDING METHODS FOR STATUS MONITORING

This application claims the benefit of U.S. provisional patent application No. 61/541,532 filed on Sep. 30, 2011 and is a continuation-in-part of commonly-owned U.S. patent application Ser. No. 13/248,184 filed on Sep. 29, 2011, which claims the benefit of commonly owned U.S. provisional application No. 61/404,525 filed on Oct. 4, 2010, U.S. provisional application No. 61/456,223 filed on Nov. 2, 2010, and U.S. provisional application No. 61/458,842 filed on Dec. 1, 2010, each of which is incorporated herein and made a part hereof by reference.

BACKGROUND OF THE INVENTION

The present invention relates to the field of networked printing systems. More specifically, the present invention relates to printing systems and methods for use in a casino gaming environment which provide improved functionality, including the ability to quickly and easily create and print custom coupons and vouchers at a gaming machine printer and to obtain in real-time printer status of multiple printers on the network.

In a casino gaming environment, it is known to provide data to gaming machines (e.g., slot machines and other types of gaming machines) from a central system server over a network. The Assignee of the present invention, TransAct Technologies Incorporated (TransAct), has developed a dual port printer for a gaming machine capable of receiving print instructions from a local controller resident in the gaming machine via a first port, and receiving print instructions from a remotely located central system server via a second port. For example, proprietary data, such as voucher (cash) information can be received over the first port from the local machine controller and printed, while non-proprietary data (coupon data) can be received over the second port from the central system server and printed. Such a dual port printer is described in commonly owned U.S. Pat. No. 6,924,903 and its related family of patents and pending applications, which are incorporated herein and made a part hereof by reference.

In such systems, the data provided to the gaming machine printer by the central system server or by the gaming machine itself is in a predetermined print layout or format loaded onto the server or resident in the gaming machine. Thus, casinos are unable to easily modify the print layout or format or to provide custom coupons targeted to particular players. Typically, software updates are required to change the print layout or format, which are time consuming and costly.

It would thus be advantageous to provide casinos with the ability to layout and customize coupons and vouchers in a quick and easy manner. It would also be advantageous to enable the casino to quickly send such custom coupons and vouchers (or templates for custom coupons and vouchers) to the gaming machines. It would be advantageous if individual gaming machines, or select groups of gaming machines, could be targeted with different custom coupons or vouchers. It would also be advantageous to enable a Casino Host to quickly identify a particular player and provide that player with a custom coupon or voucher via the gaming machine printer. In addition, it would be advantageous to easily obtain printer status of all or a group of printers on the Casino network in real-time or near real-time, without significantly affecting network overhead and data throughput.

The apparatus and methods of the present invention provide the foregoing and other advantages.

SUMMARY OF THE INVENTION

The present invention relates to a print system for a casino gaming environment in which gaming machines are fitted with a dual-port printer. More specifically, the present invention relates to systems and methods for monitoring printer status in a networked gaming environment in which a gaming machine printer is capable of printing cash vouchers under direction of a local controller (e.g., the associated gaming machine) and printing coupons under direction from a central system server/controller for the casino. However, those skilled in the art will appreciate that the present invention is not limited to a gaming machine or casino environment, but rather is applicable to any networked print system having a plurality of printers.

In accordance with one example embodiment of a system for monitoring printer status in a networked environment in accordance with the present invention, the system may comprise, for each of a plurality of printers, a respective server port device connected to a communication port of a corresponding printer, each server port device adapted to receive real-time printer status information from the corresponding printer. A status monitor is also provided for receiving the printer status information from one or more of the server port devices. The printer status information is wirelessly broadcast from the respective server port devices to an IP address of the status monitor.

The server port device may comprise a User Datagram Protocol (UDP) status processor for converting the printer status information received from the printer in a first format into a second format for broadcast using a UDP protocol. The server port device may further comprise a conversion application for converting the printer status information received from the printer in a serial format into a TCP format for communication to the status monitor via an Ethernet connection either in place of or in addition to the broadcast using the UDP protocol.

The Ethernet connection may be one of a wired or a wireless connection.

A server manager may be provided for distributing customized coupons to one or more targeted recipients at the corresponding printers via the respective server port devices. The server manager may comprise the status monitor, such that the IP address is that of the server manager.

The status monitor may be adapted to receive and respond to queries from the server manager or a central system server regarding printer status. The status monitor may consolidate the status information for one or more of the printers received from the corresponding one or more server monitors. The one or more printers may comprise one of: all printers in a casino installation; a subset of all the printers in the casino installation; selected printers in the casino installation; or selected groups of printers in the casino installation.

The status monitor may also enable configuration of a timing of the broadcast. For example, the timing of the broadcast may be configured to be on a periodic basis or each time the printer status changes.

In one example embodiment, the printer may be embedded in or associated with a casino gaming machine. The printer may communicate the printer status information to the gaming machine via a serial connection. The gaming machine may communicate print data to the printer via the serial connection.

The printer status information may comprise at least one of the following printer conditions: printer mechanism busy; downloads present; Electronic Gaming Machine/coupon flag; printer chassis open; printer chassis closed; print head cover open; print head cover closed; top of form; paper low; paper out; paper jam; ticket in chute; print in progress; print complete; print incomplete; field of interest 1; field of interest 2; field of interest 3, and the like.

The present invention also includes a method for monitoring printer status in a networked environment. In an example embodiment of a method f monitoring printer status in a networked environment, the method may comprise: for each of a plurality of printers, receiving, at a respective server port device connected to a communication port of a corresponding printer, real-time printer status information from the corresponding printer; wirelessly broadcasting the printer status information from the respective server port devices to an IP address of a status monitor; and receiving the printer status information at the status monitor from one or more of the server port devices.

The method may also include additional features discussed above in connection with the various embodiments of the corresponding system.

BRIEF DESCRIPTION OF THE DRAWINGS

The present invention will hereinafter be described in conjunction with the appended drawing figures, wherein like reference numerals denote like elements, and:

FIG. 6 shows a block diagram of an example embodiment of the present invention capable of real-time monitoring of printer status.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention relates to a print system for a casino gaming environment in which gaming machines are fitted with a dual-port printer. In a typical casino gaming environment, a dual-port printer is connected to the gaming machine controller (local controller) on a first port and a central system server/controller on a second port. The gaming machine controller provides the printer with information for printing cash vouchers. The central system controller, which may be networked together with all gaming machines in the casino (or all gaming machines within a particular area in a casino), provides the printer with coupon data.

Figure 1:
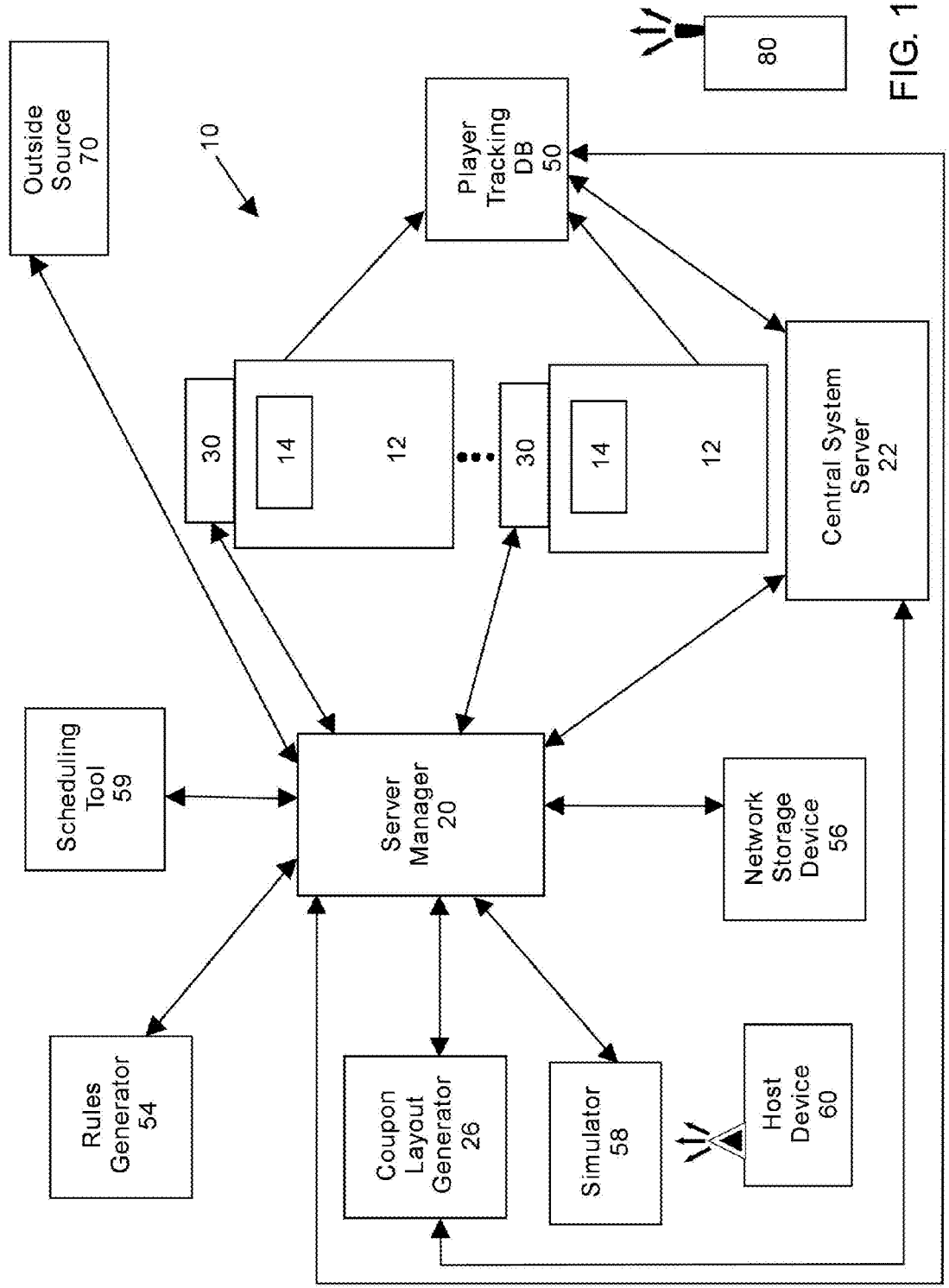
FIG. 1 shows a block diagram of an example embodiment of a system in accordance with the present invention.
Figure 2:
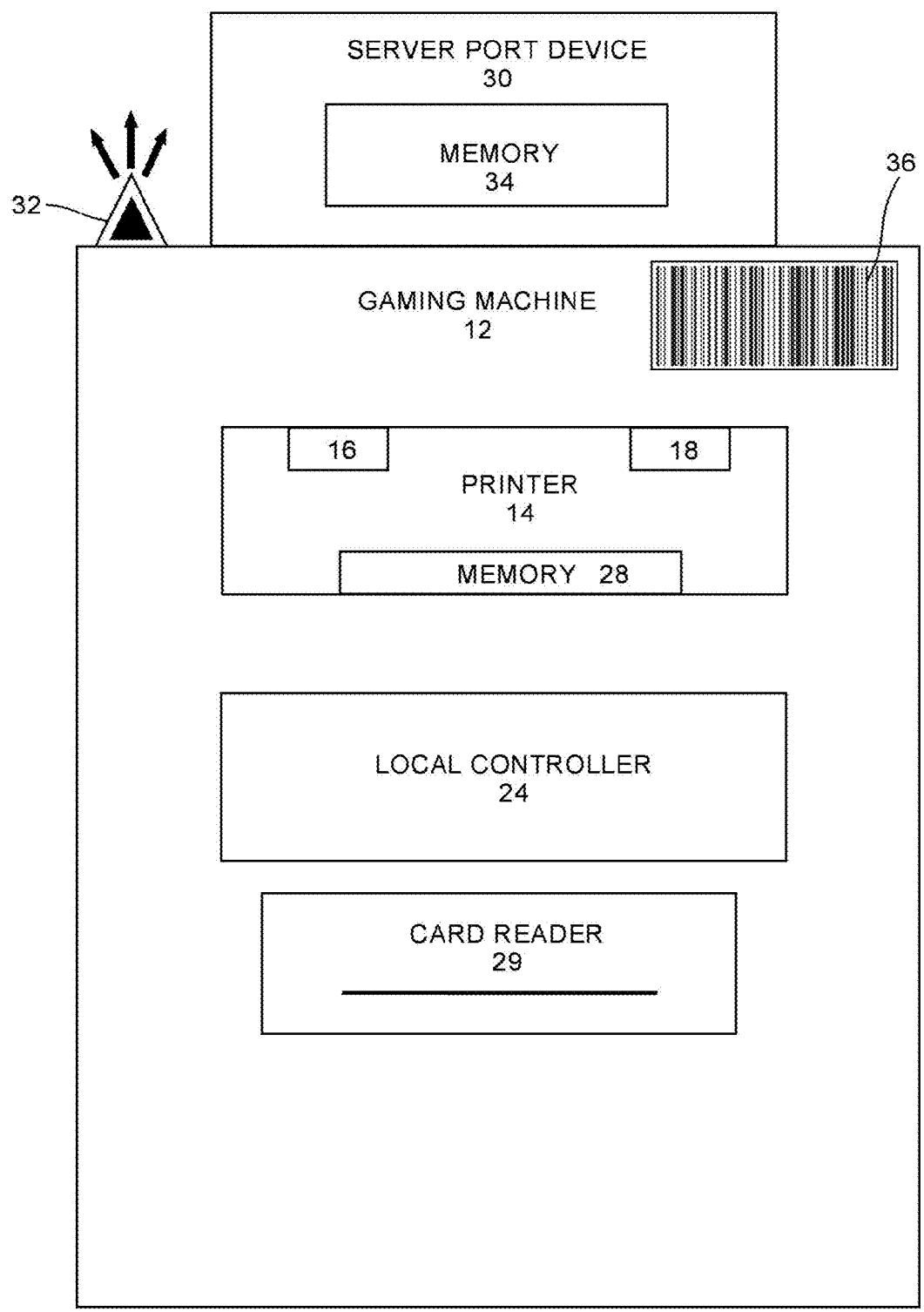
FIG. 2 shows a block diagram of an example embodiment of a gaming machine with integral printer in accordance with the present invention.

FIG. 1 illustrates an example embodiment of a system 10 for providing customized coupons in a casino gaming environment. A printer 14 (e.g., a dual port printer) is resident in a gaming machine 12. A block diagram of an example embodiment of a gaming machine 12 with integral printer 14 in accordance with the present invention is shown in FIG. 2. The printer 14 may have at least one communication port for communications external to the gaming machine 12. For example, the printer may have a first communication port 16 for communication to an external server (as explained in detail below) and a second communication port 18 dedicated to communications with a local controller 24 resident in the gaming machine 12. A coupon layout generator 26 may be provided for creating customized coupons. The server manager 20 is provided for distributing the customized coupons to one or more targeted recipients (e.g., particular gaming machine printers 14 and players thereat). The server manager 20 may be connected to the first communications port 16 of the printer typically designated for a central system server 22. However, since the server manager 20 generates an Ethernet signal, a server port device 30 is provided in-between the server manager 20 and the first communication port 16 of the printer 14. The server port device 30 converts the Ethernet signal from the server manager 20 to a serial signal recognizable by the printer 14. An IP address is assigned to the server port device 30 and the IP address, together with player identification information (obtained as explained in detail below), is used by the server manager 20 to determine appropriate coupons for distribution to the gaming machine 12.

A server port device 30 may be connected in-between the server manager 20 and each gaming machine printer 14. The server port device 30 may be resident in each of the gaming machines 12. The connection between the server port device 30 and the server manager 20 may be a wireless Ethernet connection or a wired connection. In a wireless embodiment, in order to improve the wireless reception, an access point 32 may be provided on top of each gaming machine 12 for receiving the wireless signal from the server manager 20, with a wired connection between the access point 32 and the server port device 30 resident within the gaming machine 12. Alternatively, the server manager 20 and the server port devices 30 on each gaming machine 12 may be hardwired together. In either case, the server port device 30 will receive an Ethernet signal from the server manager 20 and convert this signal to a high-speed serial signal for communication to the printer 14. For example, the server port device 30 may provide data to the printer 14 in one of an RS-232, Netplex, USB, USB/Netplex, RS-232/Netplex or I2C format.

The server port device 30 may also be provided with memory 34 to facilitate such a data conversion and to buffer data prior to sending it to the printer 14. Accordingly, the server port device 30 enables large amounts of data, including print graphics (including color graphics), to be sent from the server manager 20 to the printer 14.

The server port device 30 is assigned an IP address. This IP address may be assigned by (or otherwise known to) the server manager 20. In this way, the server manager 20 can send data to specific gaming machines 12 based on the IP address of the server port device 30 associated with that gaming machine 12 for purposes of, for example, targeted advertising and promotions.

In embodiments in which the printer 14 already includes an Ethernet port (e.g., port 16 may be an Ethernet port or a further port which is an Ethernet port may be provided), the server port device 30 is not needed and the server manager 20 can communicate directly with the printer 14 over a wired or wireless connection.

The server manager 20 may be a separate server which is also connected to the casino's central system server 22. Alternatively, the server manager 20 may be integrated into the casino's central system server 22 or comprise software miming on the central system server 22. The server manager 20 is capable of managing all the printers 14 on the network (or those printers 14 on the network assigned to that server manager 20, as it is conceivable that more than one server manager 20 may be used in a large network). For example, via the server manager 20 it can be designated which printers 14 will be provided with a particular coupon or coupons (or other data, such as software upgrades, printer templates, promotional materials, advertisements, cash vouchers, rewards, informational materials, forms, and the like, as discussed in further detail below). If the content of the coupon is directed at all players in the casino, the server manager 20 will direct all printers 14 in the network to print the coupon at the appropriate time (e.g., when a player begins play, ends play, or reaches a certain level/time of play). If the content of the coupon is directed to a group of players or a single player, the server manager 20 will distribute the coupon(s) for printing accordingly.

The server manager 20 may be connected to the coupon layout generator 26. The coupon layout generator 26 may comprise a software program resident in a computer connected to the server manager 20 directly or via the central system server 22. Alternatively, the coupon layout generator 26 may comprise a dedicated device. In either case, the coupon layout generator 26 may be connected (wired or wirelessly) to the server manager 20. The coupon layout generator 26 provides the ability to quickly create custom coupons, promotional materials, advertisements, rewards, informational materials, forms, and the like (all collectively referred to herein as "coupons").

Figure 3:
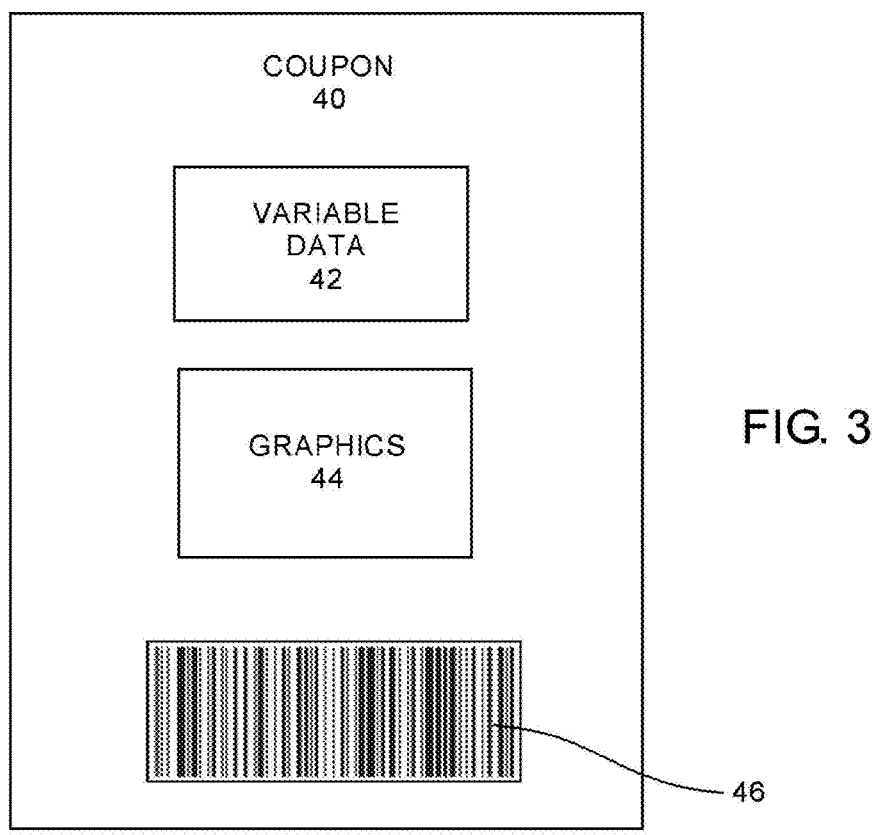
FIG. 3 shows an example embodiment of a customizable coupon in accordance with the present invention.

FIG. 3 shows a sample coupon 40 that can be produced by the coupon generator 26. The coupons may be color coupons. In particular, the coupons may be "two-color" or "full-color" coupons, which colors correspond to the printing capabilities of the gaming machine printers 14. The coupon layout generator 26 may also be used to create templates for coupons and/or cash vouchers which can be communicated to the local controllers 24 of the gaming machines 12 (e.g., via the server manager 20) and retained in memory (e.g., printer memory 28 or memory of the local controller 24) for use in printing cash vouchers or coupons under control of the local controller 24 of the gaming machine 12. Variable data 42 can then be sent to the printer 14, along with a print command. The variable data 42 and print command may be provided by either the server manager 20 or the local controller 24 of the gaming machine 12. Pre-defined fields of the stored templates can be populated with the received variable data 42 prior to printing of the coupon 40 (or voucher, etc.). Similarly, graphics can be communicated to the printer memory 28 and stored therein for use in populating the appropriate graphic field(s) 44 of a template upon receipt of the appropriate command.

Gaming machines 12 typically have a card reader 29 adapted to read a player's identification card. As is known in the art, such a card tracks each player's gaming habits (including but not limited to personal information, preferences, dates and times of play, amount spent, winnings, and the like). As each gaming machine 12 is in communication with the server manager 20 and/or a player tracking database 50 (directly or via the central system server 22), the server manager 20 is able to indentify the players at each gaming machine (as long as the player's card is inserted in the card reader) via information from the player identification card provided to the system 10 by the card reader 29. If no card is inserted, the server manager 20 will be aware that an un-carded player is playing a particular gaming machine 12, and appropriate coupons, rewards, and advertising materials can be targeted to such un-carded players with incentives to obtain their identification cards.

Coupons may be provided to a particular gaming machine 12 based on at least one of the player identification information, playing time on the gaming machine 12, amount spent on game play, amount won or lost on gaming machine 12, average amount spent per casino trip, gaming machine denomination, data tracked by a player tracking database 50, and the like. The player identification information may include at least one of demographic information, individual player characteristics, player habits, gaming tendencies, player preferences, time since last visit, expected next visit, player ranking, player tier, and the like.

The server manager 20 may direct coupons to individual players, groups of players, or all players depending on pre-determined promotional rules (e.g., generated by a rules generator 54 as discussed in detail below). The server manager 20 may also manage the distribution of real-time advertising and promotional materials, and related information, to the gaming machine 12 for printing at the printer 14, as discussed in detail below.

Figure 4:
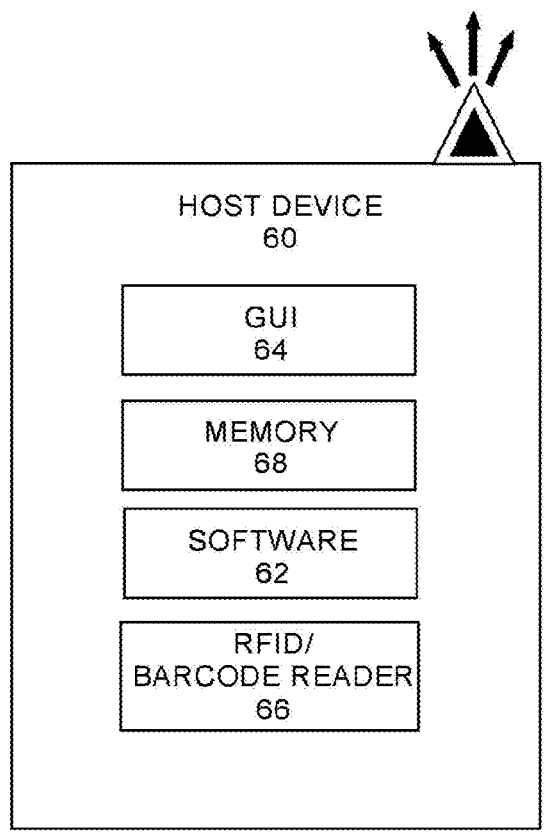
FIG. 4 shows an example embodiment of a personal computing device for use by a casino host in accordance with the present invention.

In addition, coupons may be directed to a particular player by a Casino Host via an application 62 running on a portable personal computing device (host device) 60, such as that shown in FIG. 4. Various coupons (e.g., developed and provided by the coupon layout generator 26) can be stored in memory 68 on the personal computing device 60 or accessed by the portable personal computing device 60 from another networked location (e.g., the server manager 20, coupon generator 26, or a networked storage device 56). The Host may walk the Casino floor with the personal computing device 60 and identify one or more players at particular gaming machines 12 that the host desires to send a coupon or voucher to. The Host can then choose a stored coupon to send to the gaming machine(s) 12 being played by the identified player(s). After selecting the coupon, the Host can enter any variable data into the coupon if required (e.g., name of player, machine identification information, coupon value, expiration date, or other coupon information) via a user interface 64 on the personal computing device 60 and send the coupon to the gaming machine 12. The personal computing device 60 may be wirelessly connected to at least one of the server manager 20 and the server port device 30. Where the personal computing device 60 is wirelessly connected to the server manager 20, the coupon may be routed through the server manager 20, which can match the player name or machine identification number to the gaming machine 12 or to the corresponding player identification information obtained from the player information card. In this way the server manager 20 can identify the IP address of the server port device 30 of the appropriate gaming machine 12 and forward the coupon or voucher from the personal computing device 60 to the corresponding gaming machine printer 14. Alternatively, where the personal computing device 60 is wirelessly connected to the server port device 30, the coupon may be routed directly to the server port device 30 of the particular gaming machine 12 and printed at printer 14.

The player name, machine identification number, or IP address of the server port device 60 associated with the gaming machine 12 (or other information used to identify a particular gaming machine 12 or its server port device 30) may be manually entered into the personal computing device 60. Alternatively, the gaming machines 12 and/or the server port devices 30 may be provided with barcodes 36 (as shown in FIG. 2) containing the individual identification information for the particular gaming machine 12 or its associated server port device 30. In such an embodiment, the personal computing device 60 may be provided with a bar code reader 66 (either in the form of a software application, a built-in barcode reader, or plug-in hardware device). The barcode reader 66 of the personal computing device 60 can identify the gaming machine 12/server port device 30 by reading the barcode 36 of the gaming machine 12 or its associated server port device 30.

Alternatively, the personal computing device 60 may be used to read a barcode on the player identification card to obtain the player identification information, which can then be used to send a coupon to the gaming machine 12 being played by the player. In addition, the personal computing device 60 may be adapted to read the magstripe on the player identification card to obtain the player identification information.

Figure 5:
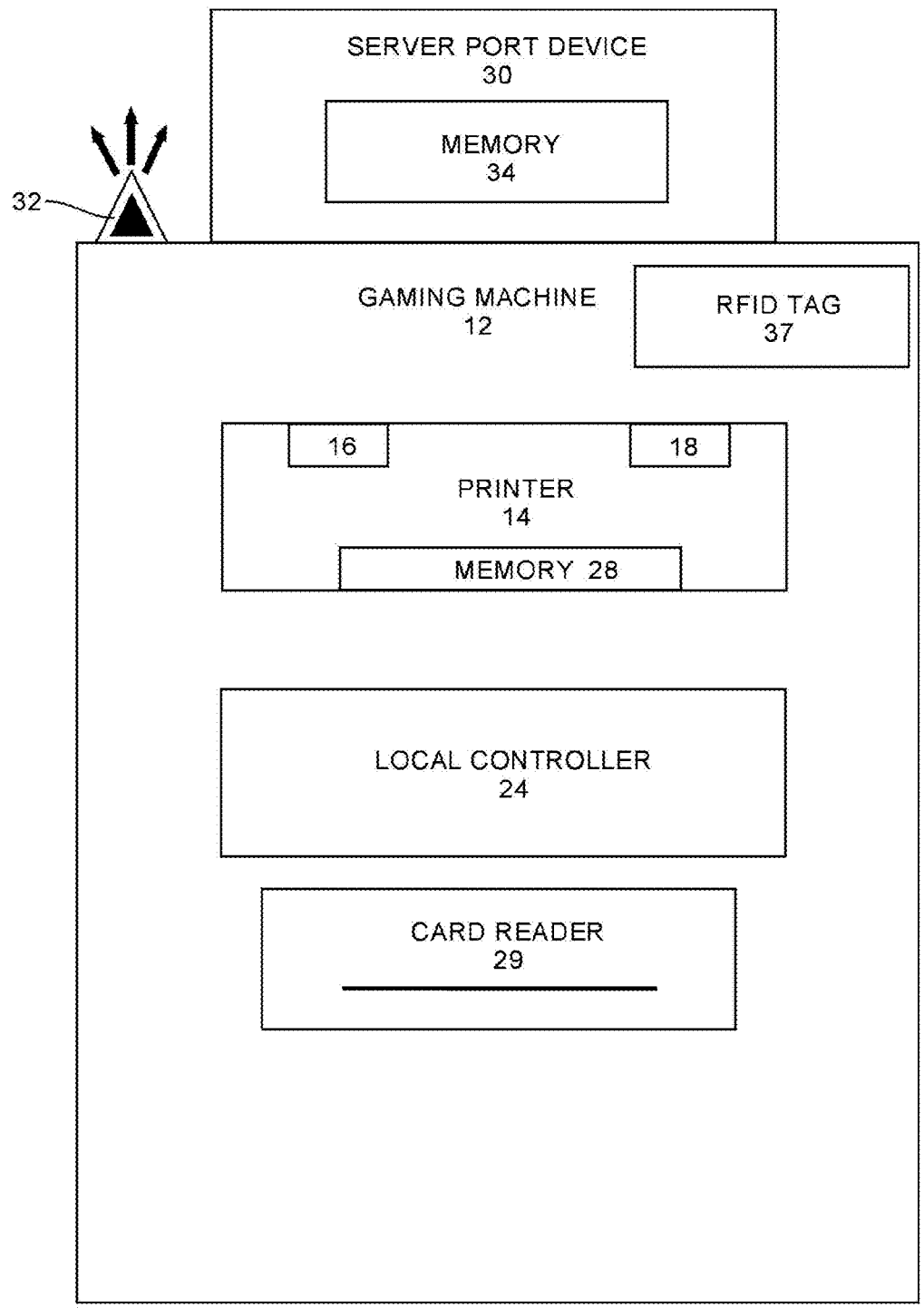
FIG. 5 shows a further example embodiment of a gaming machine with integral printer in accordance with the present invention.

As shown in FIG. 5, the gaming machine (or the associated server port device 30) may alternatively be provided with an RFID tag 37. The personal computing device 60 may be enabled to read the RFID tag (e.g., via a software application, a built-in RFID tag reader 66, or a plug-in RFID tag reader). The personal computing device 60 can thus obtain the identification information for a particular gaming machine 12, or the IP address of the gaming machine's server port device 30, via the RFID tag.

Alternatively, the personal computing device 60 can route the coupon or voucher directly to the server port device 30 (e.g., via a wireless connection) for printing at the printer 14. For example, the personal computing device 60 may act as a secondary server manager and have a version of the server manager software 62 installed on it. In such an embodiment, the personal computing device 60 may also be in communication with the main server manager 20 to provide such transaction details for Casino record keeping (either at the time of each such transaction or in a batch transfer at designated intervals). Further, in such an embodiment the personal computing device 60 may also be connected to the coupon layout generator 26 so that updated coupons and vouchers can be provided. Alternatively, a version of the coupon layout generator software 62 may be installed on the personal computing device 60 so that custom coupons, vouchers, promotional materials, advertising materials, and the like can be created as needed by the Host on the personal computing device 60.

The portable personal computing device 60 may comprise an iPAD™ or equivalent tablet computing device, laptop computer, netbook, or the like. Those skilled in the art will appreciate that the portable personal computing device 60 may also comprise smart phones such as a Blackberry™, iPhone™, Droid™, or the like, or an iTouch™, or similar devices, as long as the device has the required processing power to run the application, sufficient data storage, and wireless connectivity.

The coupons can be modified to target specific players or classes of players. The coupons can also be directed to all players. The present invention enables direct marketing to gaming machine players and provides players with incentives for increased visits and extended playing time. The system 10 is easy to install, as the server manager 20 is easily integrated into the casino's network and the server port device 30 simply plugs into the existing port 16 on the dual port printer 14 that is normally in communication with the central system server 22. The remaining printer port 18, connected to the local controller 24 resident in the gaming machine 12, is unaffected by the present system.

The system 10 will also advantageously allow players to skip the normal stop at the casino promotions booth to collect weekly coupons. Instead, the coupons can be targeted to each player once that player inserts his or her card into a gaming machine 12. This provides an advantage to the player and the casino, since the players can avoid waiting in line at the promotions booth and proceed directly to the gaming machines 12 and thereby gain additional playing time.

The system 10 also enables real-time advertising and promotions. For example, coupons with advertisements can be sent to the gaming machine printers 14 advertising current or upcoming specials, events, promotions or player attractions. In addition, such coupons can include "bounce-back" promotions, offering incentives (e.g., free play or discounts) if the player returns in a predetermined amount of time. The coupons may also enable the casino to drive specific player actions, by providing incentives for play between certain dates and/or times, or providing rewards for playing on a certain date. The system 10 can also be configured to automatically complete and print forms for contest entries and event entries for a particular player at the gaming machine 12. Tickets to shows and other events can also be purchased and printed at the gaming machine 12 (e.g., in exchange for money remaining on the machine or money added to the machine). This enables the casino to obtain revenue for otherwise unsold tickets and to capture players dollars that may otherwise be cashed out. Real-time retail and food and drink coupons can also be sent to and printed at each gaming machine 12. Gaming tournament entries and results can also be sent to and printed at the gaming machines 12. Also, targeted birthday and anniversary promotions and discounts may be sent to individual players. Contest and tournament results the player is involved in can also be sent to and printed at the gaming machine 12. Further, hotel promotions and discounts may be sent to and printed at the gaming machine 12. Tax forms (e.g., that may be required as a result of any gambling proceeds) may be provided as well. Other types of coupons and forms may also be provided to and printed at the gaming machines 12 in accordance with the present invention, as will be apparent to those of ordinary skill in the art.

The coupon layout generator 26 enables the design and creation of custom coupons 40 (or templates for coupons/vouchers). Any number of different coupons can be created. Graphics 44 and logos can be imported into the coupons 40 and the corresponding data can be converted by the system into a format recognizable by the printer 14. Barcodes 46 can be supported by the coupon layout generator 26. In particular, barcodes 46 can either be imported into a coupon 40 from an outside source 70 associated with the casino (e.g., a service provider such as a hotel, restaurant, retail establishment, or the like) or created at the coupon layout generator 26 for insertion into a coupon. The barcodes 46 may be read by the service provider's barcode reader when redeemed by the player as is typically the case when coupons are redeemed by a customer. This barcode information can then be provided back to the central system server 22 and used to track the use of the coupons. Multiple coupons can be created and saved for later use. It should be appreciated that the application program interface for the coupon layout manager can be presented in any language. Similarly, the coupons can be created in any language or converted from one language to another (e.g., for example, to send to both English speaking players and players speaking a foreign language).

As discussed above, the server manager 20 sends coupons received from the coupon layout generator 26 to specific gaming machine printers 14 on the floor based on the IP address of the server port device 30 associated with that printer 14 (or an IP address associated with the printer in the case of an Ethernet printer). The server manager 20 may be adapted to add dynamic text to the coupon, such as an expiration date, event date, or the like. The server manager 20 may include an application program interface which enables links to player tracking databases 50 and other sources or systems (outside sources 70) within or associated with the casino (e.g., point-of-sale systems at retail establishments, restaurants, and other vendors (for discounts, promotions, barcode information, etc.), theater computer systems (for determining available theater seating for events), hotel computer systems (for reservation information, room discounts, and the like) and others). The server manager 20 is also enabled to select individual or multiple gaming machines 12 and send coupons to such machine(s) 12 for printing.

The server port device 30 may be a plug-in device that connects to the printer 14 without any modification thereto. Thus, the server port device 30 is a simple upgrade to existing gaming machine printers 14 that enables the printing of custom coupons, as discussed in detail above. However, the server port device 30 provides additional beneficial functionality. For example, the server port device 30 also enables the downloading of printer firmware, the monitoring of printing events and printer status (as discussed in more detail below), and custom configuring of each gaming machine printer 14. Such functionality reduces gaming machine downtime and reduces maintenance costs.

Those skilled in the art will appreciate that the server port device 30 also enables communications from the gaming machine 12 back to the server manager 20, the central system server 22, and/or to the player tracking database 50. In this way, the server manager 20 can be provided with identifying data regarding the player and the gaming machine 12 being played, so that coupons can be targeted directly to the player based on the player's demographics, individual characteristics, habits, gaming tendencies, and the like.

As discussed above, an Ethernet connection is required for connecting the server manager 20 to the printer 14. Such a connection is enabled by the server port device 30, which has an Ethernet input and which converts the Ethernet signal into a high-speed serial signal that the printer 14 can accept. The Ethernet connection between the server manager 20 and the server port device 30 can be wired or wireless as discussed above. A wireless connection is more advantageous, as a wired connection will require high speed Ethernet cables and adequate data closet for each machine to be connected. The wireless connection does not interfere with the gaming machine 12 (other than the possible addition of a wireless access point 32 on top of the machine as discussed above).

The system may further comprise a rules generator 54 associated with the server manager 20 for creating and modifying rules governing when coupons are to be sent to the gaming machine 12. For example, a rule may be created that prints a coupon once a player reaches a predetermined period of cumulative play on one or more gaming machines 12 during a single casino visit. Parameters for the rule may be modified once the rule is created. For example, for an offer that was originally created to pay out after 60 minutes of play, the predetermined cumulative time period can be changed from 60 minutes to 90 minutes. Other rules can be imagined and are within the scope of the present invention.

In addition, the system may further comprise a simulator 58 associated with the server manager 20 for simulating coupon distribution based on actual play on a gaming machine 12 over a predetermined time period without actually generating and printing the coupons. A data set for the actual play over the predetermined time period may be recorded. Multiple simulations for a promotion may be run on the data set, each promotion having different parameters for coupon issuance. The simulator 58 may be run in the background during actual game play or recorded game play, without actually generating or printing any coupons, in order to test expected results of particular promotions. This allows a casino to see the amount of coupons that would have been printed for a given promotion with a given set of parameters.

The system may also comprise a scheduling tool 59 associated with the server manager 20 for scheduling promotions and coupon distribution. For example, the scheduling tool 59 may be used to schedule when certain promotions will be active or inactive, such as during certain times of the day, days of the week, times of year, seasons, and the like. The server manager 20 may automatically distribute coupons corresponding to a scheduled promotion to the printer 14 in accordance with scheduling information obtained from the scheduling tool 59.

The system may also comprise a software application for a personal computing device 80 of a gaming machine player (e.g., a smart phone, tablet computer, or the like). The software application may enable the player to at least one of: select types of coupons to be received from the casino; input or update personal identification information to the casino; input or update demographic information; select from a group of offered coupons or promotions and enable the selection to print automatically from the gaming machine that the player plays next; complete tournament and contest entry forms; review tournament and contest results; receive advertising, promotional materials, or rewards from the casino or a retail establishment associated with the casino, or the like. The selected coupons or other material can then be printed from a gaming machine printer the next time the player visits the casino and inserts his or her player identification card. This application may be provided as part of a Casino's current downloadable player application or made to look like an offering from a particular casino.

As shown in FIG. 6, the server port device 30 communicates with the server manager 20 over an Ethernet connection 72 using TCP protocol and includes a conversion application 74 for converting the Ethernet signal to a serial signal recognizable by the printer 14. Communications between the server port device 30 and printer 14 requires the establishment of a connection 76 (opening a port) to the printer 14 for transmission of data and status. These ports/connections 72, 76 are typically opened for transmission of data and then closed when idle to limit system overhead. Although FIG. 6 shows only a single printer 14 and server port device 30 for ease of explanation, as discussed above it should be appreciated that there are typically multiple printers 14 on the network, each with an associated server port device 30. One of the problems with monitoring the status of a large number of printers using TCP protocol is the necessity of continually opening and closing large numbers of these ports. If done sequentially, the system overhead required becomes significant and the real-time state of the printer 14 cannot be accurately monitored.

Accordingly, in a further example embodiment of the present invention as shown in FIG. 6, each server port device 30 is adapted to receive real-time printer status information from the corresponding printer 14. A status monitor 82 is provided for receiving the printer status information from one or more of the server port devices 30. The printer status information may be wirelessly broadcast from the respective server port devices 30 to an IP address of the status monitor.

The server port device may include a UDP status processor 78 which utilizes User Datagram Protocol (UDP). UDP protocol does not require the establishment of connections and thus allows multiple server port devices 30 to broadcast printer status to a single IP address (e.g., an IP address of the status monitor 82, which may be resident in the server manager 20) in real time. Each server port device 30 receives printer status from its associated printer 14 over the serial port connection 76 and provides the printer status to the UDP status processor 78. The UDP status processor 78 converts the printer status information received from the printer from a first format (e.g., a serial format) into a second format for broadcasting using UDP protocol. In addition to the UDP broadcast (or alternatively thereto), the serial port device 30, via the conversion application 74, can convert the printer status information from the serial format received from the printer into a TCP format for communication to the status monitor 82 via an Ethernet connection. The Ethernet connection may be a wired or a wireless connection.

The status monitor 82 may be located at the server manager 20 as shown in FIG. 6. In such an embodiment, the IP address of the status monitor is the same as that of the server manager 20. Alternatively, the status monitor 82 may be implemented separately from the server manager 20 (e.g., as part of the central system server 22 or a stand alone device) with a unique IP address. The status monitor 82 may consolidate the status information received from all printers 14 in a casino installation (or a designated subset or selection of such printers 14). The status monitor 82 can also be queried by the server manager 20 (or central system server 22) to obtain real time printer status.

The timing of the broadcast is configurable by the status monitor 82 such that the server port devices 30 can be set to broadcast printer status either on a periodic basis or whenever printer status changes. Thus, the status of all printers 14 on the network (or a designated subset of printers 14) can be provided to the status monitor 82 in real-time or near real-time, without significantly affecting network overhead and data throughput.

As shown in FIG. 6, the printer 14 may also communicate its status to the associated gaming machine 12 via a serial connection 84. The gaming machine 12 also communicates print data (e.g., for vouchers) to the printer 14 via the serial connection 84.

The status conditions supported by the status monitor 82 may include: Printer Mechanism Busy; Downloads Present (not power cycled); EGM/Coupon Flag (used to determine the source of a mechanism busy notification, including whether the printer is printing a cash voucher from the local controller (gaming machine 12) or a coupon from a central system controller); Printer Chassis Open/Closed; Print Head Cover Open/Closed; Top of Form; Paper Low; Paper Out; Paper Jam; Ticket in Chute; Print in Progress; Print Complete; Print Incomplete; Field of Interest 1; Field of Interest 2; Field of Interest 3; and the like. The "Fields of Interest" may be defined in the document template (coupon or cash voucher), such that, once a defined field of interest is printed, the printer reports on that status. All of these status conditions are defined by the Gaming Device Standard (GDS) printer protocol.

Methods corresponding to the system embodiments provided above are also included within the scope of the present invention.

Additional details regarding various aspects of the present invention may be found in *Promotional Printing System Requirements Document v2.5* attached to U.S. provisional application No. 61/404,525 filed on Oct. 4, 2010 at Appendix A, which document is respectfully incorporated herein and made a part hereof by reference.

It should now be appreciated that the present invention provides advantageous methods and apparatus for providing, inter alia, customizable coupons to gaming machines and improved monitoring of printer status.

Although the invention has been described in connection with various illustrated embodiments, numerous modifications and adaptations may be made thereto without departing from the spirit and scope of the invention as set forth in the claims.

What is claimed is:

1. A system for monitoring printer status in a networked environment, comprising:
   for each of a plurality of printers, a respective server port device connected to a communication port of a corresponding printer, each server port device adapted to receive real-time printer status information from the corresponding printer; and
   a status monitor for receiving the printer status information from one or more of the server port devices, the printer status information being automatically wirelessly broadcast from the respective server port devices to an IP address of the status monitor;
   wherein:
   the server port device comprises a User Datagram Protocol (UDP) status processor for converting the printer status information received from the printer in a first format into a second format for the broadcast using a UDP protocol, which enables real-time printer status communications without the need to open and close printer communication ports;
   the status monitor enables configuration of a timing of the broadcast; and
   the timing of the broadcast can be configured to be on a periodic basis or each time the printer status changes.

2. A system in accordance with claim 1, wherein the server port device further comprises a conversion application for converting the printer status information received from the printer in a serial format into a TCP format for communication to the status monitor via an Ethernet connection either in place of or in addition to the broadcast using the UDP protocol.

3. A system in accordance with claim 2, wherein the Ethernet connection is one of a wired or a wireless connection.

4. A system in accordance with claim 1, wherein:
   a server manager is provided for distributing customized coupons to one or more targeted recipients at the corresponding printers via the respective server port devices;
   the server manager comprises the status monitor; and
   the IP address is that of the server manager.

5. A system in accordance with claim 4, wherein the status monitor is adapted to receive and respond to queries from the server manager or a central system server regarding printer status.

6. A system in accordance with claim 1, wherein the status monitor consolidates the status information for one or more of the printers received from the corresponding one or more server monitors.

7. A system in accordance with claim 6, wherein the one or more printers comprise one of: all printers in a casino installation; a subset of all the printers in the casino installation; selected printers in the casino installation; or selected groups of printers in the casino installation.

8. A system in accordance with claim 1, wherein:
the printer is embedded in or associated with a casino gaming machine;
the printer communicates the printer status information to the gaming machine via a serial connection; and
the gaming machine communicates print data to the printer via the serial connection.

9. A system in accordance with claim 1, wherein the printer status information comprises at least one of the following printer conditions: printer mechanism busy; downloads present; Electronic Gaming Machine/coupon flag; printer chassis open; printer chassis closed; print head cover open; print head cover closed; top of form; paper low; paper out; paper jam; ticket in chute; print in progress; print complete; print incomplete; field of interest 1; field of interest 2; and field of interest 3.

10. A method for monitoring printer status in a networked environment, comprising:
for each of a plurality of printers, receiving, at a respective server port device connected to a communication port of a corresponding printer, real-time printer status information from the corresponding printer;
automatically wirelessly broadcasting the printer status information from the respective server port devices to an IP address of a status monitor;
receiving the printer status information at the status monitor from one or more of the server port devices;
configuring, via the status monitor, a timing of the broadcast to be on a periodic basis or each time the printer status changes;
wherein the server port device comprises a User Datagram Protocol (UDP) status processor for converting the printer status information received from the printer in a first format into a second format for the broadcasting using a UDP protocol, which enables real-time printer status communications without the need to open and close printer communication ports.

11. A method in accordance with claim 10, wherein the server port device further comprises a conversion application for converting the printer status information received from the printer in a serial format into a TCP format for communication to the status monitor via an Ethernet connection either in place of or in addition to the broadcast using the UDP protocol.

12. A method in accordance with claim 11, wherein the Ethernet connection is one of a wired or a wireless connection.

13. A method in accordance with claim 10, wherein:
a server manager is provided for distributing customized coupons to one or more targeted recipients at the corresponding printers via the respective server port devices;
the server manager comprises the status monitor; and
the IP address is that of the server manager.

14. A method in accordance with claim 13, further comprising:
receiving queries at the status monitor from the server manager or a central system server regarding printer status; and
responding to the queries with requested printer status information.

15. A method in accordance with claim 10, further comprising:
consolidating, by the status monitor, of the status information for one or more of the printers received from the corresponding one or more server monitors.

16. A method in accordance with claim 15, wherein the one or more printers comprise one of: all printers in a casino installation; a subset of all the printers in the casino installation; selected printers in the casino installation; or selected groups of printers in the casino installation.

17. A method in accordance with claim 10, wherein:
the printer is embedded in or associated with a casino gaming machine;
the printer communicates the printer status information to the gaming machine via a serial connection; and
the gaming machine communicates print data to the printer via the serial connection.

18. A method in accordance with claim 10, wherein the printer status information comprises at least one of the following printer conditions: printer mechanism busy; downloads present; Electronic Gaming Machine/coupon flag; printer chassis open; printer chassis closed; print head cover open; print head cover closed; top of form; paper low; paper out; paper jam; ticket in chute; print in progress; print complete; print incomplete; field of interest 1; field of interest 2; and field of interest 3.

* * * * *